(12) United States Patent
Charytoniuk et al.

(10) Patent No.: US 11,995,045 B1
(45) Date of Patent: May 28, 2024

(54) CUSTOMIZED RULE-BASED COLLECTIONS

(71) Applicant: Google LLC, Mountain View, CA (US)

(72) Inventors: Tomasz Charytoniuk, San Francisco, CA (US); Dmitry Shapiro, San Francisco, CA (US)

(73) Assignee: Google LLC, Mountain View, CA (US)

( * ) Notice: Subject to any disclaimer, the term of this patent is extended or adjusted under 35 U.S.C. 154(b) by 20 days.

(21) Appl. No.: 16/853,632

(22) Filed: Apr. 20, 2020

Related U.S. Application Data

(63) Continuation of application No. 14/607,057, filed on Jan. 27, 2015, now Pat. No. 10,628,392.

(60) Provisional application No. 61/932,210, filed on Jan. 27, 2014.

(51) Int. Cl.
G06F 16/21 (2019.01)
(52) U.S. Cl.
CPC .................... G06F 16/21 (2019.01)
(58) Field of Classification Search
CPC .... G06F 16/951; G06F 16/958; G06F 16/335; G06F 16/21
See application file for complete search history.

(56) References Cited

U.S. PATENT DOCUMENTS

| | | | |
|---|---|---|---|
| 9,377,991 B1* | 6/2016 | Rapport | G06F 3/0482 |
| 2005/0246689 A1 | 11/2005 | Radhakrishnan et al. | |
| 2007/0067301 A1 | 3/2007 | Malik | |
| 2011/0035384 A1* | 2/2011 | Qiu | G06Q 10/107 707/748 |
| 2012/0331053 A1 | 12/2012 | Dunn | |
| 2014/0149506 A1 | 5/2014 | Yuan | |
| 2014/0223099 A1 | 8/2014 | Kidron | |
| 2015/0013016 A1* | 1/2015 | Kanter | H04L 67/10 726/28 |
| 2015/0046259 A1 | 2/2015 | Hicken et al. | |
| 2015/0149329 A1* | 5/2015 | Tam | G06F 8/60 705/27.2 |

* cited by examiner

*Primary Examiner* — Etienne P Leroux
*Assistant Examiner* — Cindy Nguyen
(74) *Attorney, Agent, or Firm* — Lowenstein Sandler LLP

(57) ABSTRACT

A method is provided including presenting a user interface to allow a user of a social networking service to create a new collection for collecting a set of content items for the user, and upon a user request to create the new collection, adding the new collection to a list of collections associated with a user profile of the user, and presenting, in the user interface, the new collection as part of the list of collections associated with the user profile at the social networking service. The further includes in response to receiving, via the user interface, a user selection of an edit collection button with respect to the new collection, allowing the user to add an additional content item to the new collection from the list of collections associated with the user profile, and in response to receiving, via the user interface, a user selection of a share collection button with respect to the new collection, allowing the user to share the new collection with one or more other users of the social networking service, wherein sharing the new collection with the one or more other users causes a notification to be provided to the one or more other users according to one or more rules.

20 Claims, 20 Drawing Sheets

CUSTOMIZED RULE-BASED COLLECTIONS

CROSS-REFERENCE TO RELATED APPLICATION

This application is a continuation application of U.S. patent application Ser. No. 14/607,057, filed Jan. 27, 2015, which claims priority to U.S. Provisional Patent Application 61/932,210, filed Jan. 27, 2014, which is hereby incorporated by reference herein in its entirety.

BACKGROUND

User-generated content is often generated by a user and stored in various data sources for later retrieval and/or viewing. In some instances, a user may wish to share such user-generated content with one or more other users. Services such as email or other content sharing and collaboration services allow users to share user-generated content with one or more other users.

SUMMARY

The disclosed subject matter relates to a machine-implemented method including identifying a request to generate a collection for collecting a set of content items for a user. The method may further include determining a set of rules associated with the collection, the set of rules comprising one or more of one or more collection update rules or one or more collection maintenance rules. The method may further include determining access rights with respect to the collection. The method may further include generating the collection according to the set of rules, and providing access to the collection according to the access rights in response to the request. Other aspects can be embodied in corresponding systems and apparatus, including computer program products.

These and other aspects can include one or more of the following features. The method may further include receiving an indication of an update action. The method may further include updating the collection to include the content item in response to the indication. The method may further include providing access to the updated collection according to the access rights in response to the request.

At least one of the one or more collection updated rules may define an update action for automatically updating the collection in response to receiving an indication of an event occurring. The event may include a user performing an activity with respect to a first content item. The activity may be performed at a remote service. The activity may be different from adding the content item to the collection. The activity may include an action relating to the remote service.

The first content item may be a new content item and the update action may include adding the new content item to the collection. The first content item may be one of the content items of the set of content items and the update action may include editing the content item according to the action.

The event may include a lapse of a time period. The lapse of the time period may be from a time of a content item of the set of content items being added to the collection. The update action may include deleting a content item of the set of content items from the collection.

The update action may include one of adding a new content item to the collection, editing a content item of the set of content items from the collection or deleting a content item of the set of content items from the collection.

Each of the one or more collection maintenance rules may define an automatic action to be taken in response to an update of the collection. The automatic action may include notifying a specific set of users regarding the update. The set of rules may be defined based on a specific type of content items. The access rights may include a list of users having access to the collection.

The disclosed subject matter also relates to a system including one or more processors and a machine-readable medium comprising instructions stored therein, which when executed by the processors, cause the processors to perform operations including identifying a collection for collecting a set of content items for a user. The operations may further include determining a set of rules associated with the collection, the set of rules comprising one or more rules for automatically updating the collection according to an event with respect to at least one content item. The operations may further include determining that the event has occurred. The operations may further include updating the collection according to the rules in response to determining that the event has occurred. Other aspects can be embodied in corresponding systems and apparatus, including computer program products.

These and other aspects can include one or more of the following features. For example, updating the collection may include one of adding a new content item to the collection, editing a content item of the one or more content items from the collection or deleting a content item of the one or more content items from the collection.

The disclosed subject matter also relates to a machine-readable medium including instructions stored therein, which when executed by a machine, cause the machine to perform operations including determining a set of rules associated with a collection for collecting a set of content items for a user, the set of rules comprising one or more rules for automatically updating the collection according to an event with respect to at least one content item. The operations may further include determining access rights with respect to the collection. The operations may further include determining that the event has occurred. The operations may further include updating the collection according to the set of rules and providing access to the collection according to the access rights in response to the request.

Other aspects can be embodied in corresponding systems and apparatus, including computer program products.

These and other features of the invention described throughout the application provide one or more advantages, including but not limited to, facilitating customized rule-based collections, allowing user to create collections for grouping and sharing of content items, where rules are defined to facilitate automatic updating and maintenance of the collections.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
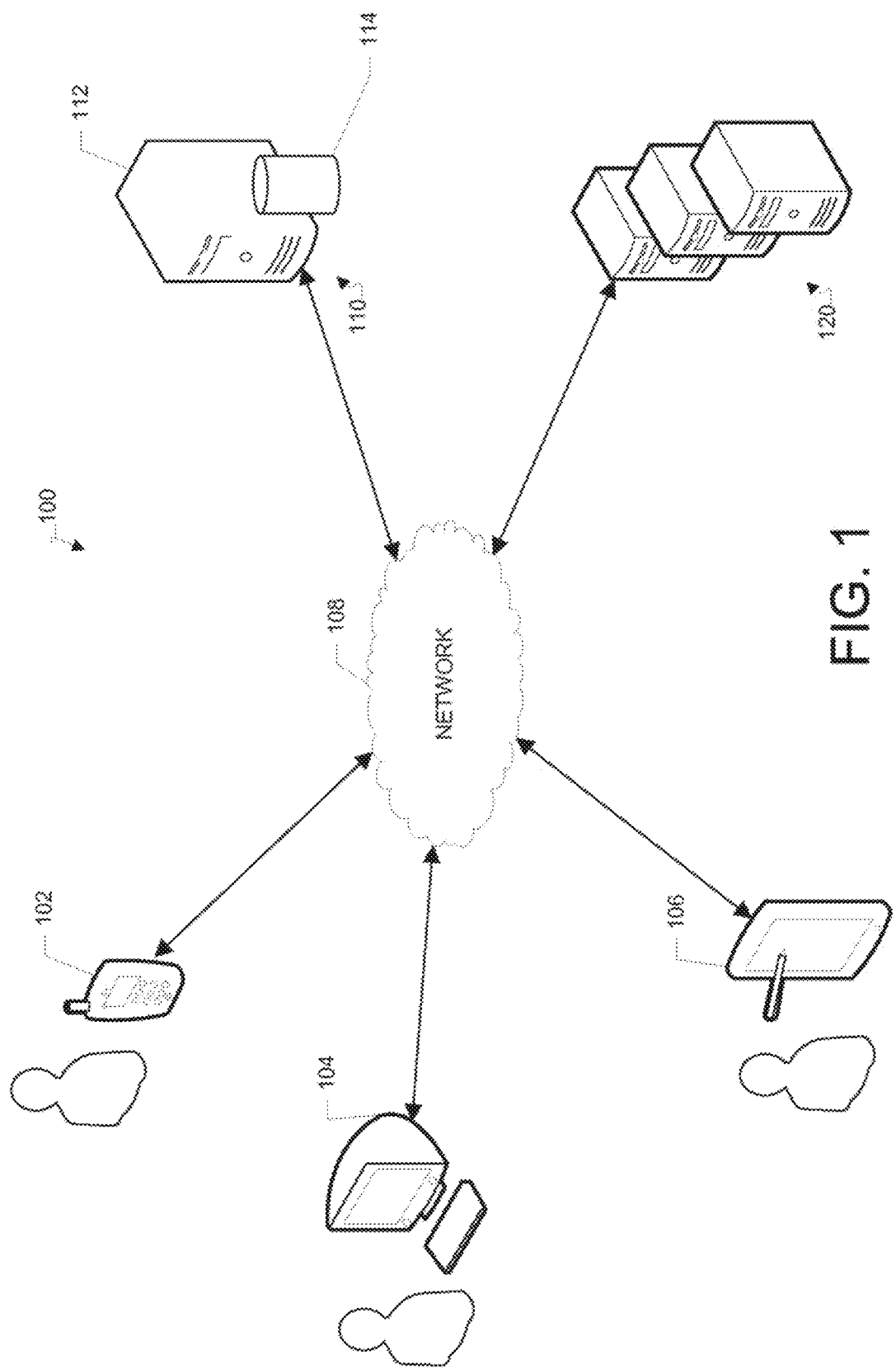
FIG. 1 illustrates an example client-server network environment, which provides for facilitating a customized rule-based collection of content.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The present disclosure provides a method and system for generating customized collections of content. A user ("owner") may create different collections, add content from various sources (e.g., third party sources, local sources, user-specific sources, etc.) to the collections, share the collections with one or more users (or allow for subscription based access to the collection), generate access rights for the collections and define different rules with respect to each of the collections.

A "collection" as used herein may refer to a grouping of one or more content items. The content may include one or more of files, text, images, links, videos, or other similar multimedia content. In one example, collections may be manually updated as a user adds one or more content to a collection. For example, various services may provide a mechanism for the user to add content to one or more collections to which the user has access rights including the right to modify the collection. In one example, existing mechanisms at one or more services and/or applications may be employed as the mechanism for adding content to one or more collections. In one example, upon activation of the mechanism, a listing of possible collections may be provided to the user and the user may select to add the specific content to a collection. In addition, collections may be updated using rules. Items within collections can be managed according to the rules.

The rules may include automatic collection updated rules, defining an event that trigger an update action with respect to a collection including adding content items to the collection, editing one or more content items within the collection, and/or deleting one or more content items of the collection. For example, content items meeting specific criteria are automatically added to a collection, recommended for a collection, edited within the collection and/or deleted from a collection. For example, the rules may include collection rules defining an action to be taken in response to a user activity at a service. Collection rules may map a specific user action or set of actions (e.g., at one or more services separate from the collection service) to a specific collection update action. In one example, a collection action results in content being added to a relevant collection for the user. For example, whenever the user rates a movie, the movie is automatically added to the movie collection, when the user purchases an item, the item gets added to the shopping collection). Other triggering events may include a lapse of specific period of time, a defined time frame or other triggering event. Such events may for example removing items in a collection after a specific period of time. In one example, in addition to collection actions defined based on specific user activity, collection rules may also be defined for specific content item characteristics, specific applications or services, or application or service characteristics, and/or for specific users (e.g., activity by a set of users may result in content being added to a collection).

The rules may further include collection maintenance rules, which refer to actions to be taken in response to updates within a specific collection and/or with respect to content items within the collection. That is, in addition to allowing for manual maintenance activity by a user, in one example, rules may be generated that allow for automatic maintenance and follow-up activity with respect to content within a collection. Example action rules may include notifying certain users when content is added to a collection, ranking items within a collection according to a specific setting, etc.

Content items within a collection may be shared with one or more users. In one example, the sharing of items may be performed using notifications. In some examples, the notifications are generated according to maintenance rules associated with the collection.

The rules may be configurable by the owner (or other users with appropriate access rights) at any time, from the generation of the collections to any time during the life span of the collections. In this manner, collections may be created, and automatically updated and/or maintained.

In one example, based on the items added to each collection, automatic updates or recommendations to the collection may also be provided to the user. For example, the content items within a collection may represent a pattern (e.g., topic, source, file type, etc.). In one example, upon detecting content items with same or similar pattern or characteristics, the service may provide recommendations to the user for adding the content item to the collection and/or may automatically add the content item to the collection.

FIG. 1 illustrates an example client-server network environment, which provides for facilitating a customized rule-based collection of content. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate generating customized rule-based collections of content for users interacting with electronic devices 102, 104, 106. Server 110 may further be in communication with remote servers 120 either through the network 108 or through another network or communication means.

The one or more remote servers 120 may perform various functionalities and/or storage capabilities described herein with regard to the server 110 either alone or in combination with server 110. In one or more embodiments, the one or more remote servers 120 may further host various services, applications and databases for generation and/or presentation of content items to users. For example, the one or more remote servers may host various blogs, newspapers, webpages, storage, photo and video sharing or other similar multi-media services providing for display and/or storage of content items. One or more remote servers 120 may further host various map and/or location services (e.g., GPS or satellite location services).

Server 110 may further maintain or be in communication with social networking services hosted on one or more remote server 120. The one or more social networking services may provide various services and may enable users to create a profile and associate themselves with other users at a remote social networking service. The server 110 and/or the one or more remote servers 120 may further facilitate the generation and maintenance of a social graph including the user created associations. The social graphs may include, for example, a list of all users of the remote social networking service and their associations with other users of a remote social networking service.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MIMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, Wi-Fi, or other such transceiver.

Users may interact with the system hosted by server 110, and/or one or more services hosted by remote servers 120, through a client application installed at the electronic devices 102, 104, and 106. Alternatively, the user may interact with the system and/or services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user interacting with a client device (e.g., electronic devices 102, 104, 106) may create an account associated with the user and may create one or more collections at the application hosted by server 110. In one example, the application may be a stand-alone application installed at the client device and/or may be accessible through a browser application at the electronic device. The user may further define various rules with respect to each collection. The rules may include one or more collection rules and/or action rules.

The user may interact with one or more services providing for display and/or generation of multi-media content items (e.g., services and/or applications hosted by one or more remote servers 120). While interacting with content items at the one or more services the user may request to add one or more content items to one or more of the user collections. In one example, a mechanism is provided to the user, allowing the user to add one or more content items from one or more services to one or more collections belonging to the user or collections which the user has access rights including adding content. In one example, the mechanisms may include existing mechanisms that are otherwise used for other purposes, such as an endorsement mechanism. The system may define rules where certain mechanisms are treated as requests for adding content to a collection. Upon receiving the user request at the service hosted by server 110, for example, through a mechanism provided to the user, server 110 determines a list of one or more collections associated with the user and may provide the list for display to the user. The user may then select to add one or more content items to one or more collections of the list of collections. In one example, the content items are received and the one or more selected collections are updated to include the one or more selected content items.

In addition to receiving specific requests from the user to update a collection, the collections may further be updated based on one or more rules associated with one or more collections. In one example, server 110 may store a user profile for each user including the collections of the user and/or a user profile and collection profile for each collection. In one example, each of the user profile and/or collection profile may include rules defined for automatic updating and maintenance of the collections associated with the user. In one example, the rules may include general rules that trigger updating one of the one or more collections of the user according to various user activity or events and/or collection specific rules that cause updates to a specific collection according to user activity or events.

In one example, a user at the client device (e.g., electronic devices 102, 104, 106) may interact with an application and/or service hosted by one or more remote servers 120 or server 110. The user may perform an activity with respect to content items at the application or service. An indication of the user activity may be received by server 110 and may trigger an automatic update of at least one collection associated with the user (e.g., according to the user profile) according to collection rules defined for the user and/or specific collection.

Various collection maintenance rules may also be associated with one or more collections associated with the user. The collection maintenance rules may define specific actions to be taken in response to an update and/or modification of a collection. In one example, the action rules may define automatic sharing rules for sharing updates to the collection with one or more users. In another example, the action rules may define actions to be taken with respect to content items within a collection, such as for example maintenance of content items, including grouping or organizing content items.

Figure 2:
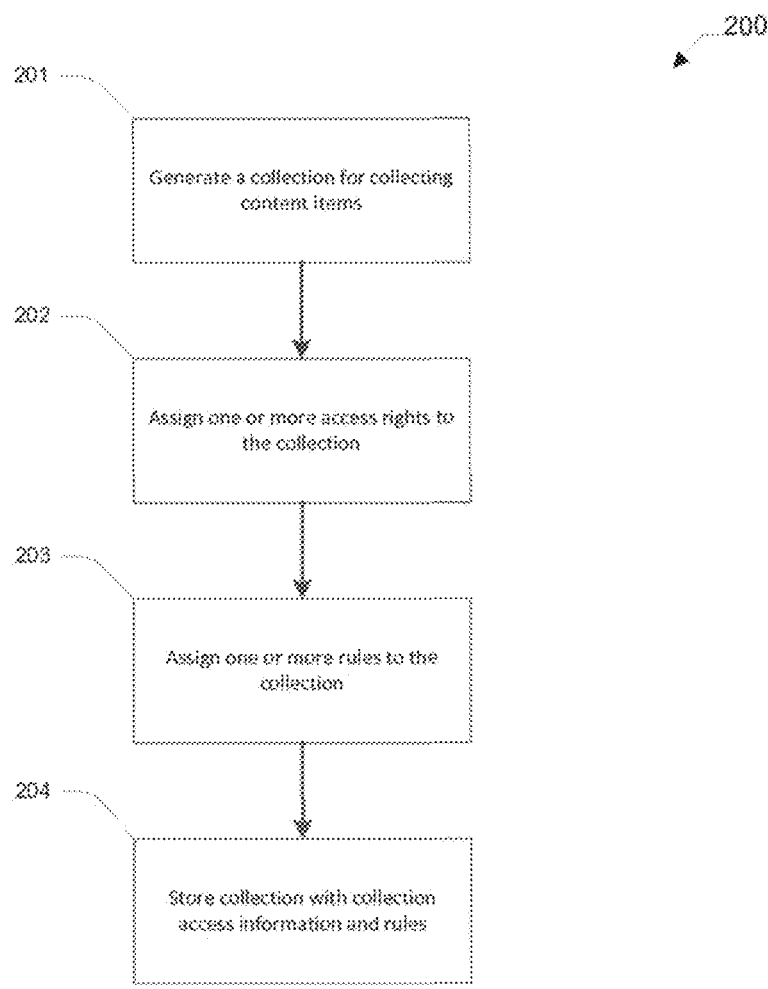
FIG. 2 illustrates a flow diagram of an example process for facilitating customized rule-based collections of content.

FIG. 2 illustrates a flow diagram of an example process 200 for facilitating customized rule-based collections of content. In step 201, an indication of a request to generate a collection for collecting one or more content items is received. In one example, the collection may be generated based on a request from a user. In some examples, the user may request to add a collection by accessing the client application at the client device, or one or more other services, in communication with the client application. The user may provide a name for the collection. In some examples, the collection may be generated automatically in response to the user selecting to add a set of content items. For example, the application (e.g., hosted by server 110) may determine a common characteristic of the set of content items (e.g., source, time, location, etc.) and may generate a collection based on the common characteristic of the content items.

In step 202, one or more access rights may be assigned to the collection. Access rights of the collection define users that can access and view the collection. In one example, the user may define the access rights for the collection. The access rights may include specific groups of users specified by the owner of the collection (or other users having rights to invite users to the collection) and/or may allow for subscription based access rights, where users from one or more selected groups or publicly may subscribe to or follow the collection. The access rights may be limited to only users specifically added by the collection owner, connections of the collection owner at one or more social networking services, public and open to all users, or limited to other specific groups of users. In one example, in addition to access and viewing rights, access rights of the collection may define one or more users having update rights for the collection (e.g., right to add or delete content items, edit content items or otherwise modify the collection). The access rights for a collection may be updated and/or modified at any point in the life span of the collection.

In step 203, one or more rules may be defined for the collection. Each rule may define an action to be performed automatically in response to a triggering event. The triggering event may include various user activity, passage of time, specific time, specific conditions being met, one or more predefined thresholds or criteria being met, or other similar events that trigger an action to be performed automatically. The action may include any activity that may be performed with respect to the collection and/or collection items.

The rules may include automatic collection updated rules, defining an event that trigger an update action with respect to a collection including adding content items to the collection, editing one or more content items within the collection, and/or deleting one or more content items of the collection. For example, content items meeting specific criteria are automatically added to a collection, recommended for a collection, edited within the collection and/or deleted from a collection. For example, the rules may include collection rules defining an action to be taken in response to a user activity at a service. Collection rules may map a specific user action or set of actions (e.g., at one or more services separate from the collection service) to a specific collection update action. In one example, a collection action results in content being added to a relevant collection for the user. For example, whenever the user rates a movie, the movie is automatically added to the movie collection; when the user purchases an item, the item gets added to the shopping collection. Other triggering events may include a lapse of specific period of time, a defined time frame or other triggering event. Such events may for example removing items in a collection after a specific period of time. In one example, in addition to collection actions defined based on specific user activity, collection rules may also be defined for specific content item characteristics, specific applications or services, or application or service characteristics, and/or for specific users (e.g., activity by a set of users may result in content being added to a collection).

The rules may further include collection maintenance rules, which refer to actions to be taken in response to updates within a specific collection and/or with respect to content items within the collection. That is, in addition to allowing for manual maintenance activity by a user, in one example, rules may be generated that allow for automatic maintenance and follow-up activity with respect to content within a collection. Example action rules may include notifying certain users when content is added to a collection, ranking items within a collection according to a specific setting, etc.

Content items within a collection may be shared with one or more users. In one example, the sharing of items may be performed using notifications. In some examples, the notifications are generated according to maintenance rules associated with the collection.

The rules may be configurable by the owner (or other users with appropriate access rights) at any time, from the generation of the collections to any time during the life span of the collections. In this manner, collections may be created, and automatically updated and/or maintained.

In step 204, the collection information including the access rights and/or rules for the collection is stored in association with the user. In one example, a collection profile is generated for each collection, and rules and/or access rights for the collection are stored within the collection profile for the collection.

Once the collection is generated according to the steps described above, the collection may be updated by adding, deleting and/or modifying content items. The collection may be updated according to the rules and/or access rights associated with the collection.

Figure 3:
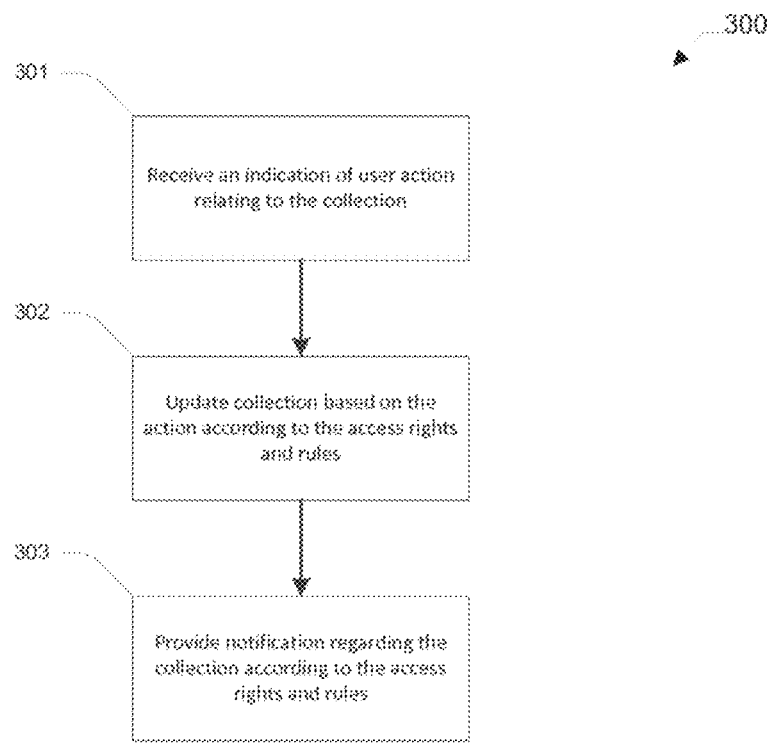
FIG. 3 illustrates a flow diagram of an example process for updating a customized rule-based collection.

FIG. 3 illustrates a flow diagram of an example process 300 for updating a customized rule-based collection. In step 301, an indication of an update action with respect to the collection is received. In some examples the update action may be an explicit request from a user to update the collection by adding one or more content items to the collection, deleting one or more content items from the collection and/or modifying one or more content items of the collection. In another example, the update action may be a rule-based update action triggered automatically. As described above, each collection may be associated with one or more rules. Each rule may be associated with a triggering event that triggers the activity associated with the rule to be performed automatically. In response to receiving an indication of a triggering event occurring, an activity associated with the event may be identified. The activity may be an update activity with respect to a content item including adding items to the collection, deleting content items from the collection or modifying content items of the collection.

In step 302, the collection is updated based on the indication according to the access rights and rules. In one example, the action is identified and the collection is updated according to the specific action associated with the indication of step 301. In one example, when performing the action with respect to the collection, it is determined if the action may be performed according to access rights associated with the collection. For example, where the update is being performed and/or triggered based on the user action, the access rights regarding the collection may be retrieved to determine if the user is authorized to modify and/or update the collection.

In step 303, a notification regarding the update to the collection may be provided according to the access rights and rules associated with the collection. In one example, one or more rules may define associated actions to be taken in response to updating the collection. For example, one or more types of notification may be available, and rules may define one or more users that should receive a notification, as well as the type of notification each user should receive in response to the update to the collection.

Figure 4A:
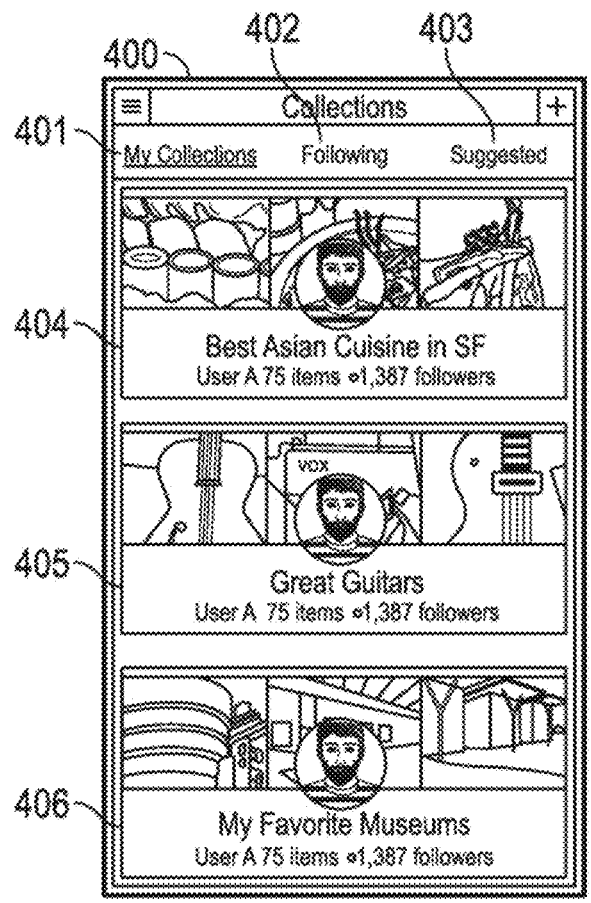
FIGS. 4A-4C illustrate screen shots of example graphical user interface displaying an example collections account of a user.
Figure 4B:
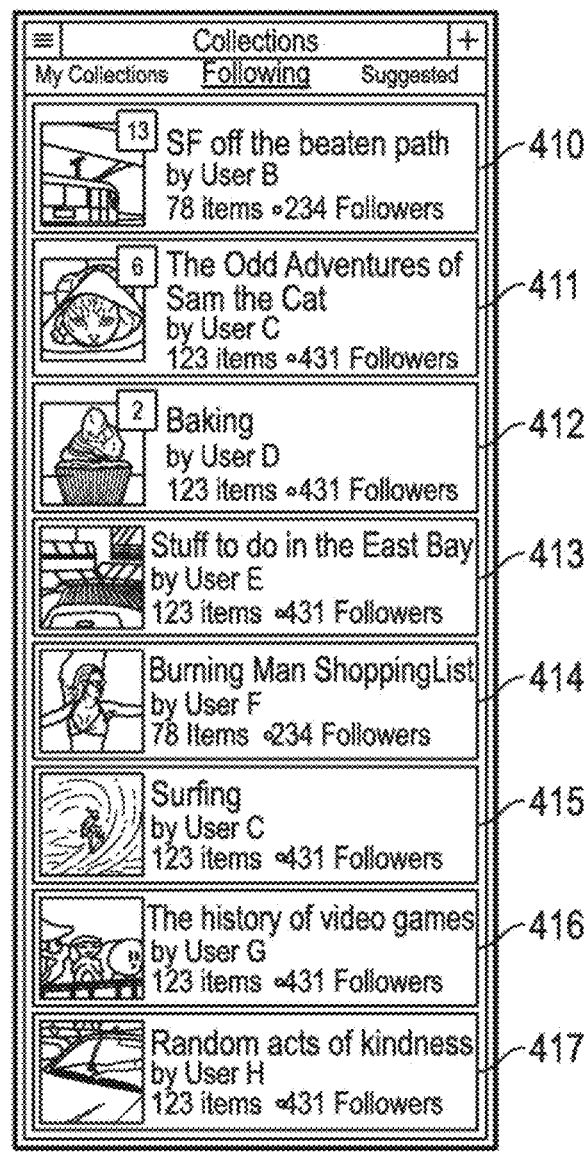
Figure 4C:
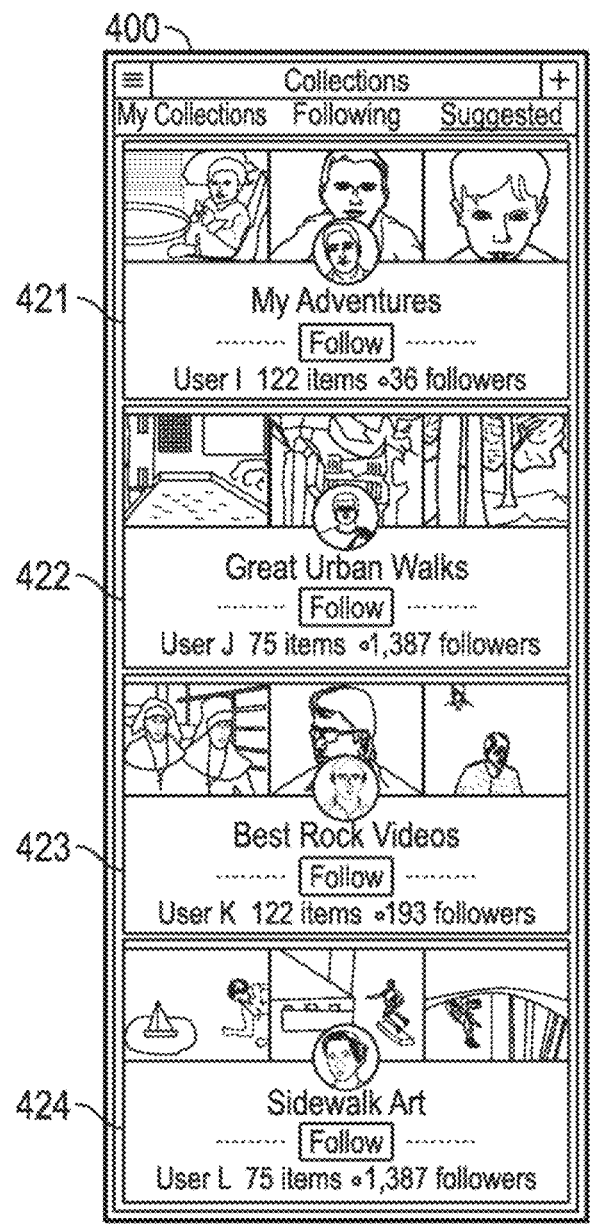

FIGS. 4A-4C illustrate screen shots of example graphical user interface 400 displaying an example collections account of a user (User A). As shown, in FIGS. 4A-4C the collections account user interface 400 includes one or more collections of the user generated according the above described processes. The user interface includes a "My Collections" tab 401, a "Following" tab 402, and a "Suggested" tab 403. FIG. 4A illustrates the user interface 400 when the My Collections tab 401 is selected. Three collections 404, 405 and 406 belonging to User A are displayed within the My Collections tab 401. Each collection may be displayed using a cover page that displays a name of the collection, the owner of the collection, number of followers for the collection, a photo of the collection owner and/or a cover photo (e.g., one or more content items within the collection).

FIG. 4B displays the graphical user interface 400 with the "Following" tab 402 selected. The Following tab 402 may display collections that User A (owner of the collections account) has subscribed to and/or is following. For example, a set of collections 410-417 being followed by User A are displayed. Each collection 410-417 may be displayed with information regarding the collection. For example, each collection 410-417 is displayed with a representative item from the collection (e.g., a photo automatically selected or selected by the owner of the collection), a collection title, an identifier of the collection owner, the number of items within the collection and number of followers of the collection.

FIG. 4C displays the graphical user interface 400 with the "Suggested" tab 403 being selected. The suggested tab 403 displays a set of collections 421-424 that may be suggested to User A for subscription and/or following based on user interest, affinity, or other indications that the user may be interested in the collection. Each collection may further include a mechanism (e.g., the "follow" button shown) for the user to begin following the suggested collection.

Figure 5A:
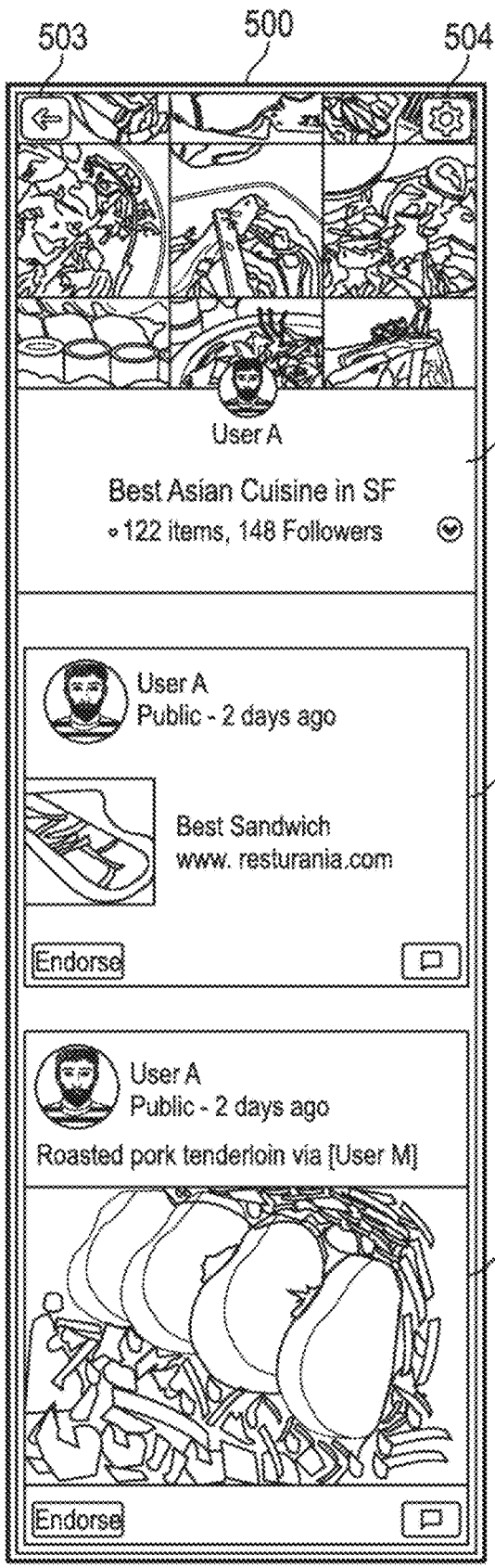
FIGS. 5A and 5B illustrate an example graphical user interface for displaying the contents of a collection of the user.
Figure 5B:
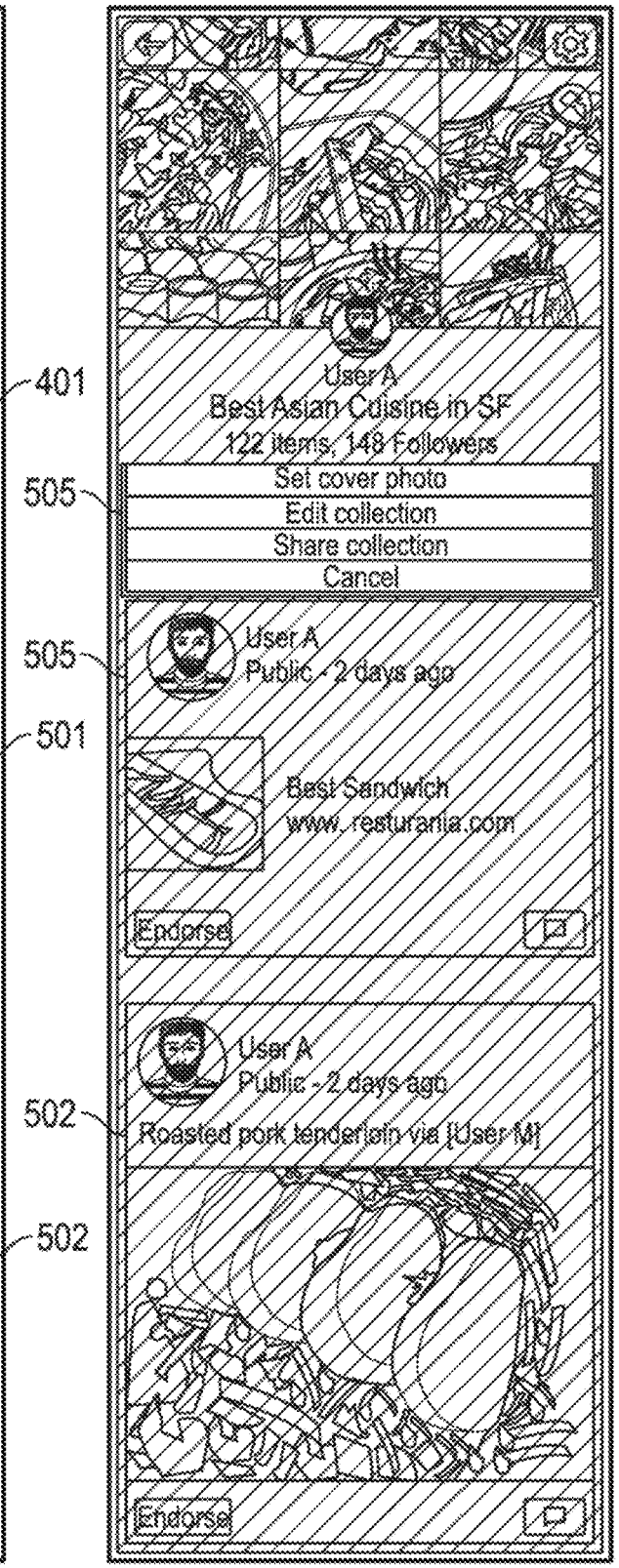

FIG. 5A illustrates an example graphical user interface 500 for displaying the contents of a collection of the user. While within the collections screen of the collections menu (e.g., graphical user interface 400) the user (User A) may select to view and/or update one of his/her collections. FIG. 5A illustrates collection 401 being selected. The collection is displayed with a cover page including a cover photo, the user identifying information and photo, the collection name, the number of items within the collection and the number of users following the collection. Additionally, content items 501 and 502 (and one or more other content items) within the collection may be displayed to the user. Each content item may include one or more mechanisms for performing social activity with respect to the content item. For example, FIG. 5A illustrates each content item 501 and 502 as having an "endorse" button and a button for commenting on the item. Furthermore, the collection user interface 500 may provide a mechanism 503 for returning to the collections page (e.g., graphical user interface 400), and an update mechanism 504 for updating the collection. In one example, in response to selecting the update mechanism 504, a menu 505 may be provided for display at the graphical user interface 500, as shown in FIG. 5B. The menu 505 may provide various options for updating the collection including setting the cover photo, editing the collection or sharing the collection. The user may for example, add one or more rules for editing and/or sharing the collection using the menu.

Figure 6A:
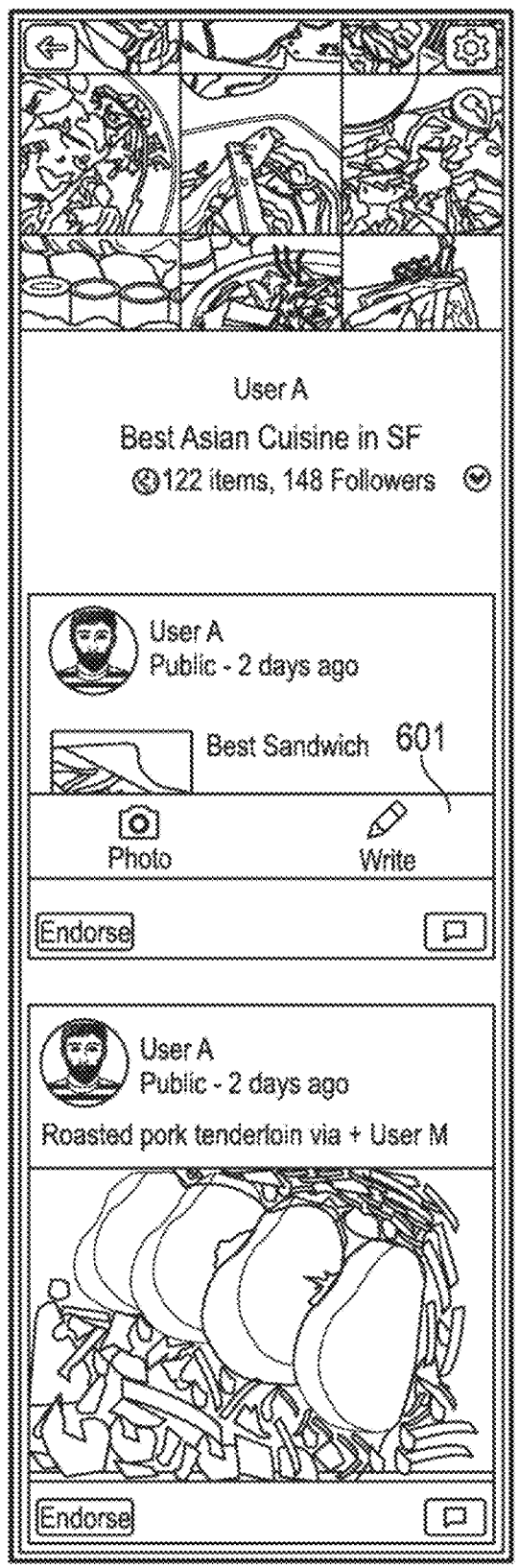
FIGS. 6A and 6B illustrate an example graphical user interface for updating a collection by adding one or more items to the collection. In one example, the user (User A) may select to edit the collection.
Figure 6B:
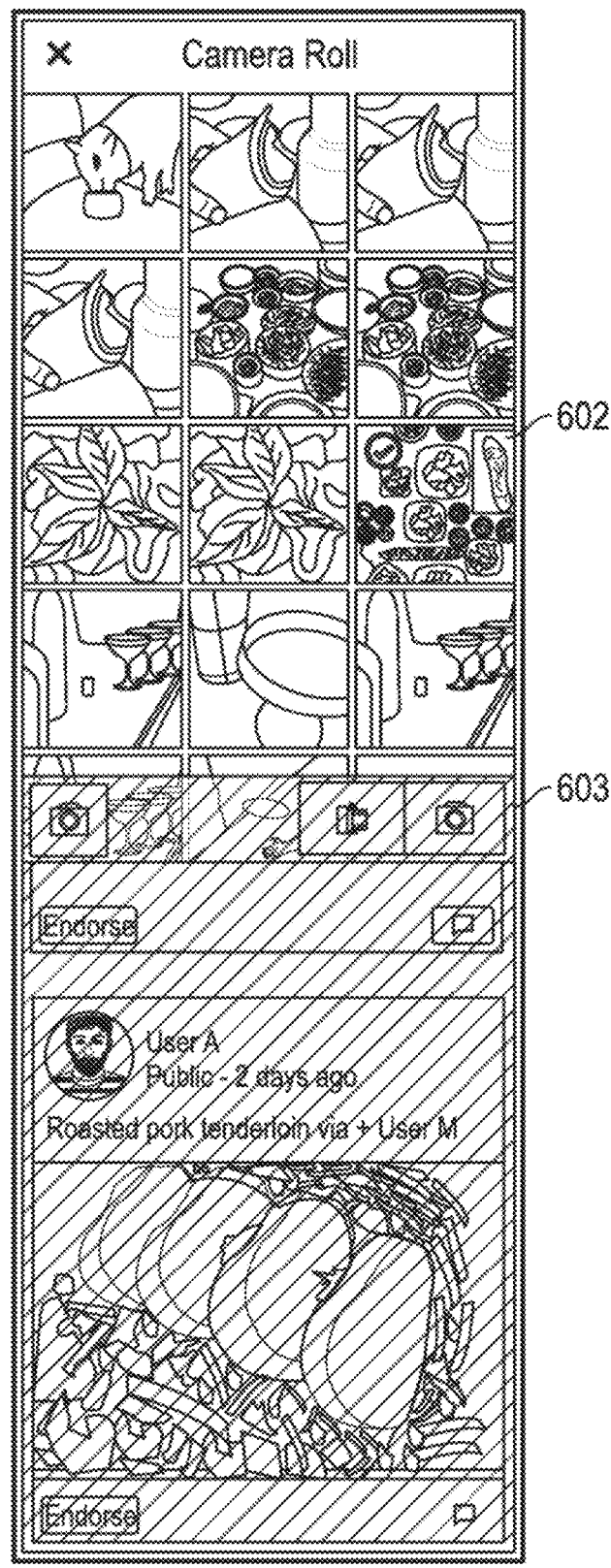

FIG. 6A illustrates an example graphical user interface 600 for updating a collection by adding one or more items to the collection. In one example, the user (User A) may select to edit the collection. A menu 601 may be presented to the user to add content items (e.g., photos) to the collection and/or to write to the collection. In response to selecting to add content items to the collection, a set of photos 602 available for upload may be provided to the user, as shown in FIG. 6B, and the user may select to add one or more photos to the collection, for example, using a selection menu 603. In some examples, other content items such as text files, videos and/or articles may similarly be added to a collection.

Figure 7A:
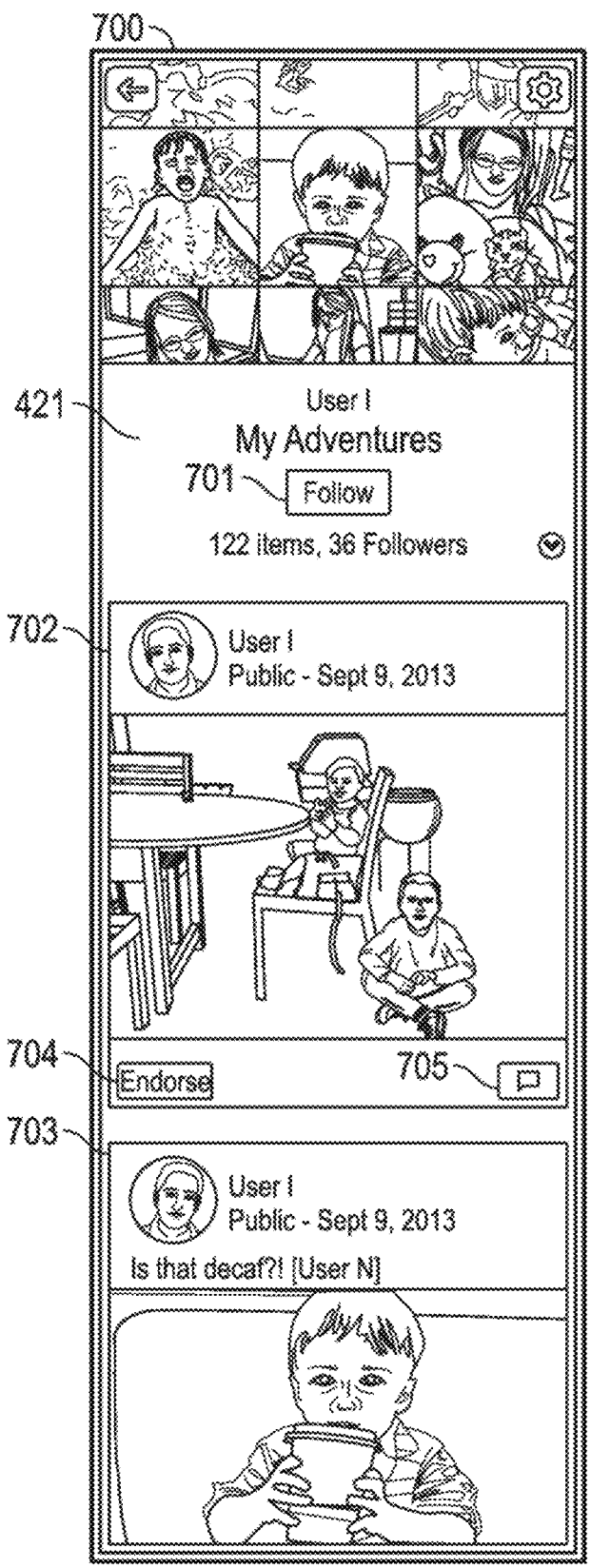
FIG. 7A-7C illustrate an example graphical user interface for viewing and/or following a collection of another user.
Figure 7B:
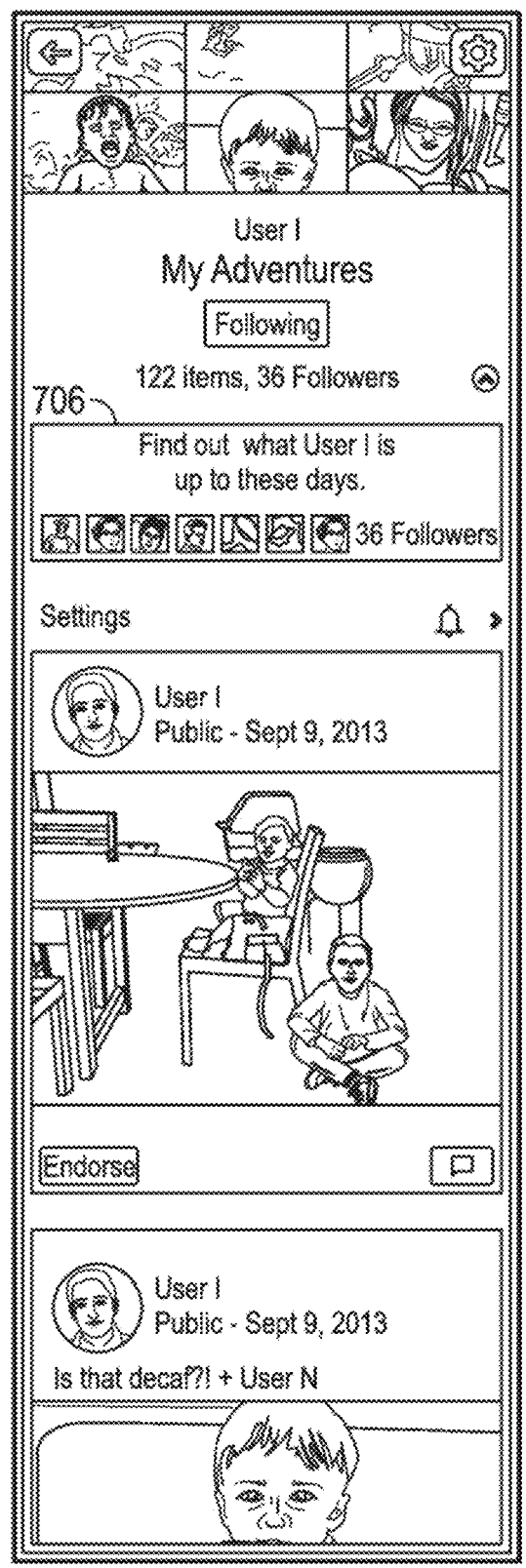
Figure 7C:

FIG. 7A illustrates an example graphical user interface 700 for viewing and/or following a collection of another user. A user (e.g., User A) may select to view a collection of a second user (e.g., Collection 421 of FIG. 4 belonging to User I). In response to the selection, the collection 421 is displayed within graphical user interface 700. The collection may be displayed with a cover photo, owner identifier information, the number of items within the collection and number of followers for the collection. In addition, one or more content items may be displayed, including, for example, items 702 and 703. One or more mechanisms may be provided for performing social activity with respect to content items within the collection, including for example an "endorse" button 704 and a comment button 705. If the user viewing the collection has not yet subscribed to the collection, a mechanism may be provided for allowing the user to follow the collection, such as the "follow" button 701 illustrated in FIG. 7A. The user may select the follow button 701, and may then be provided with indication that the user is following the collection. For example, FIG. 7B shows the user is following the collection, where "following" is provided for display. A message 706 may further be displayed to the user once the user begins to follow the collection. Once the user selects to follow a collection, a menu 710 as shown in FIG. 7C may be provided to the user, allowing the user to select settings and preferences for following the collection. In one example, the user following the collection may have rule-based settings for following a collection.

Figure 8A:
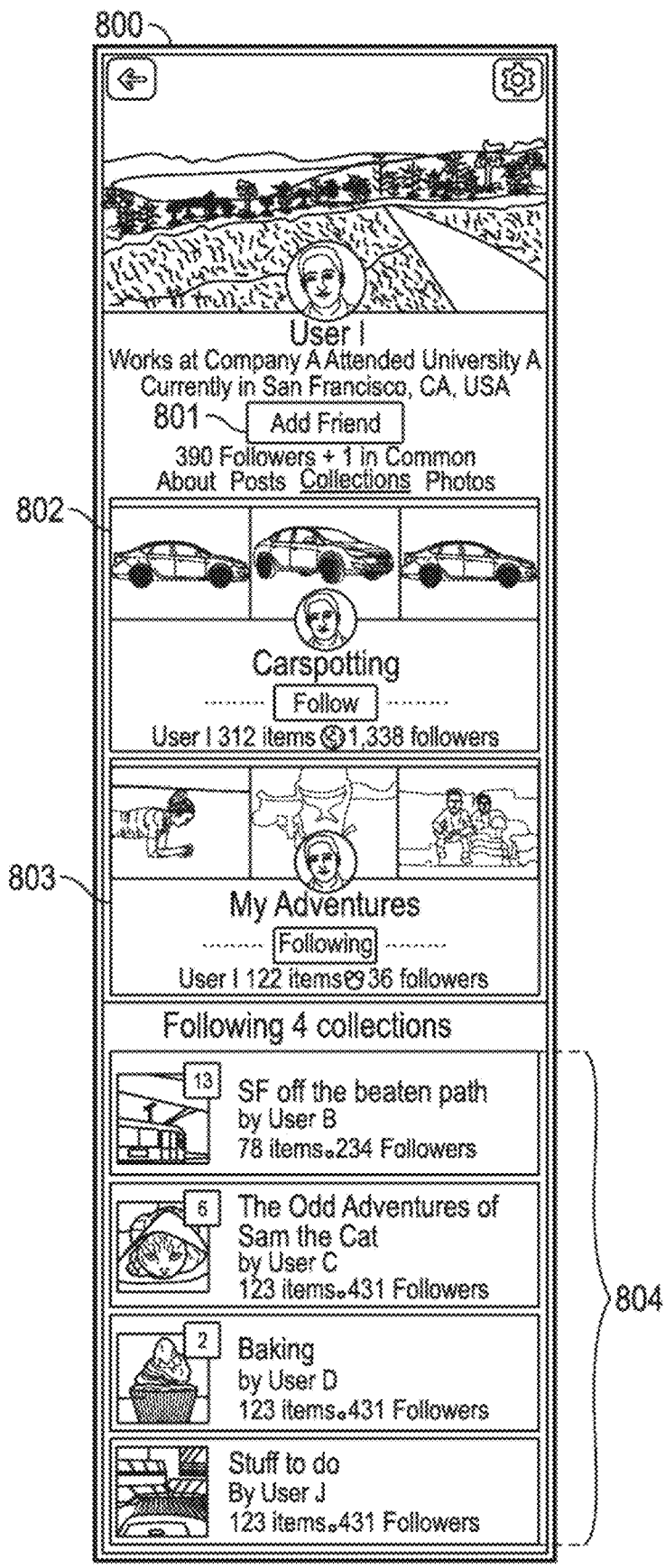
FIGS. 8A and 8B illustrate an example graphical user interface displaying a user profile for a user having one or more collections.
Figure 8B:
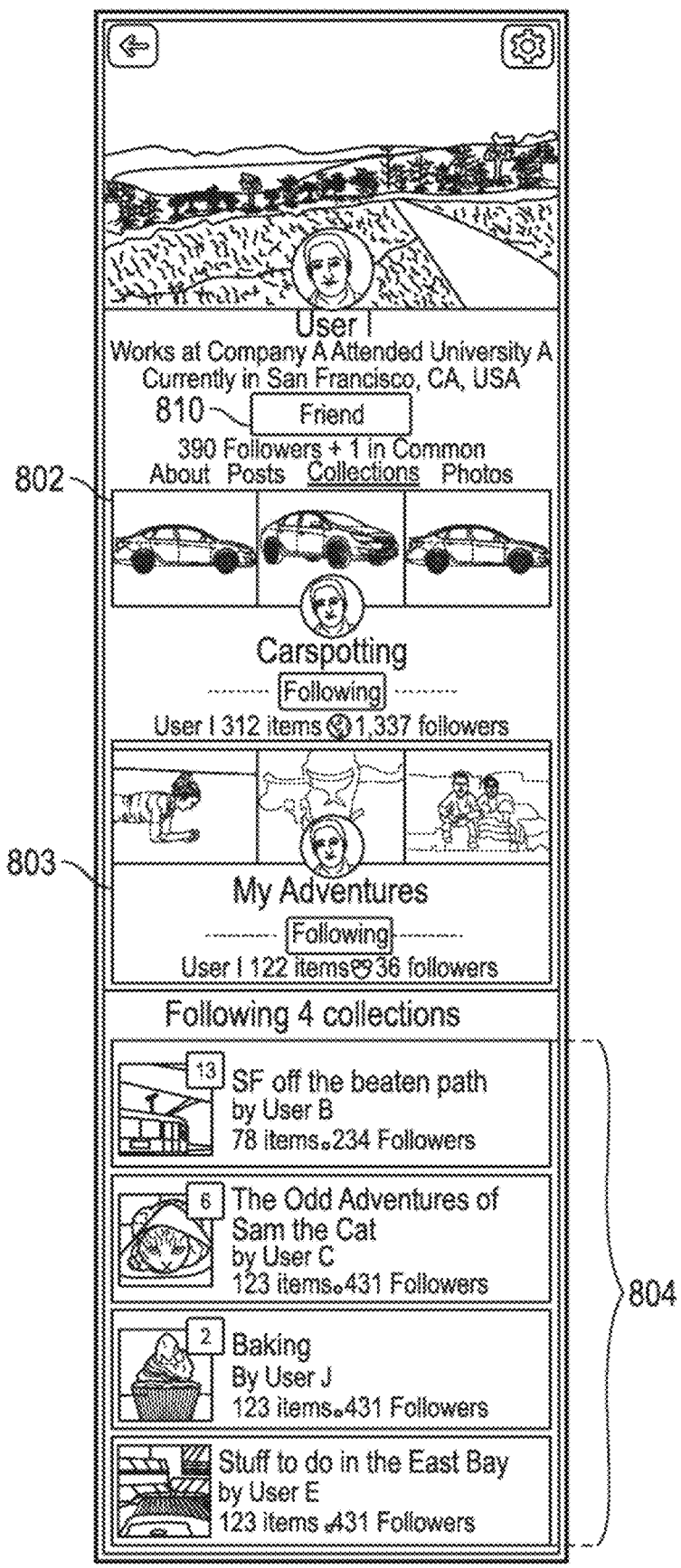

FIG. 8A illustrates an example graphical user interface 800 displaying a user profile for a user having one or more collections. A user (e.g., User A) may select to view a user profile of another user (e.g., a contact) such as User I, as shown in FIG. 8A. A user profile for User I provides various identifying information regarding the user, including, for example, user name, location, number of followers, and/or other identifying information. A mechanism, such as "Friend" button 801, may be provided for the user viewing User I's profile to add User I as a friend if User I and the user are not yet connected. A user may select the Friend button 801 to add User I. Once the user is connected to User I (e.g., in response to User I confirming the request or automatically based on various rules), a confirmation of the user and User I being connected may be provided for display to the user. When a user and User I are connected, the user profile of User I displays User I as a friend, for example, using a "Friend" indicator 810, as illustrated in FIG. 8B. In one example, one or more tabs may be provided within the user profile including, About, Posts, Collections, and Photos. A collections tab is shown in FIGS. 8A and 8B, showing information regarding the user collections, including collections belonging to User I, including collections 802 and 803, as well as collections 804 that User I is following.

Figure 9A:
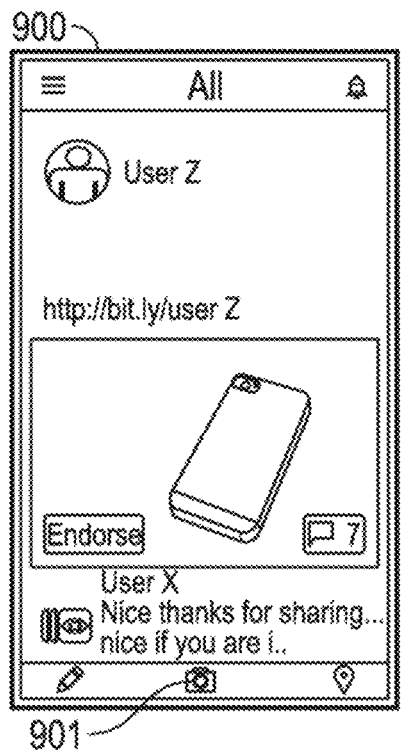
FIGS. 9A-9G illustrate an example process for adding content items to a collection.
Figure 9B:
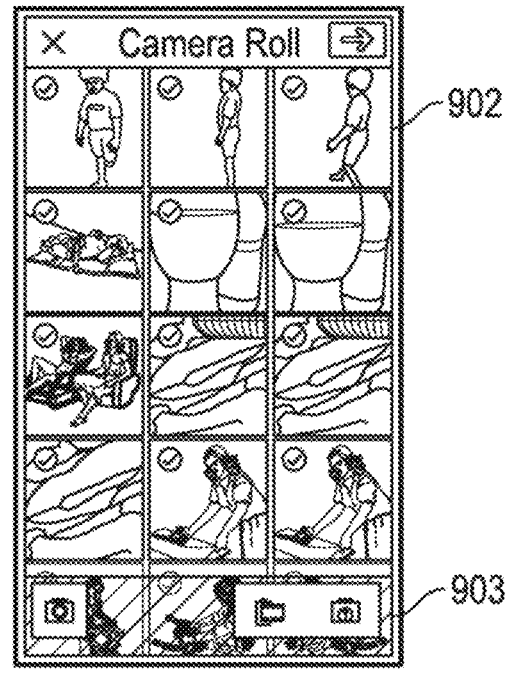
Figure 9C:
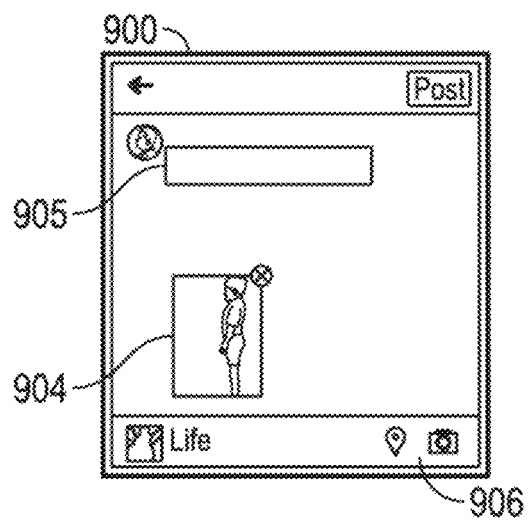
Figure 9D:
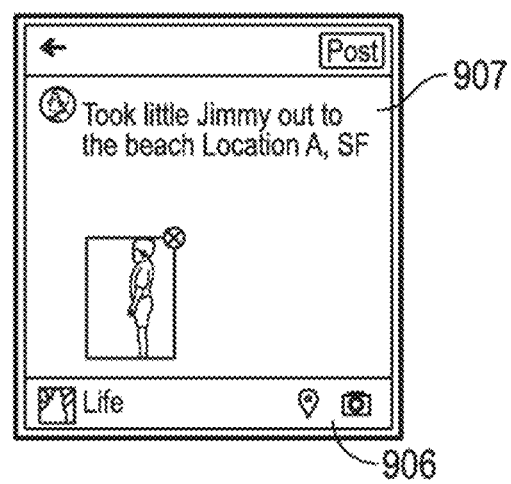

FIGS. 9A-9G illustrate an example process for adding content items to a collection. As illustrated in FIG. 9A, a user at a social networking service displayed at a graphical user interface 900 may select to add content items to a collection. The user may be provided with a mechanism 901 for adding content items. Upon selection of the mechanism 901, a collection of available content items (e.g., locally stored at the client device, at a social networking service, or at one or more third party services) may be provided for display to the user as shown in FIG. 9B. The user is able to select one or more content items and confirm the selection using a mechanism 903. Once the user selects a content item, as shown in FIG. 9C, graphical user interface 900 may display the selected content item (e.g., content item 904) and a box 905 for entering a message to be posted with the content item. The user may enter text or other items (e.g., links, tags, etc.) into the box 905. FIG. 9D illustrates the graphical user interface 900 with a message 909 being entered (e.g., via box 905).

Figure 9E:
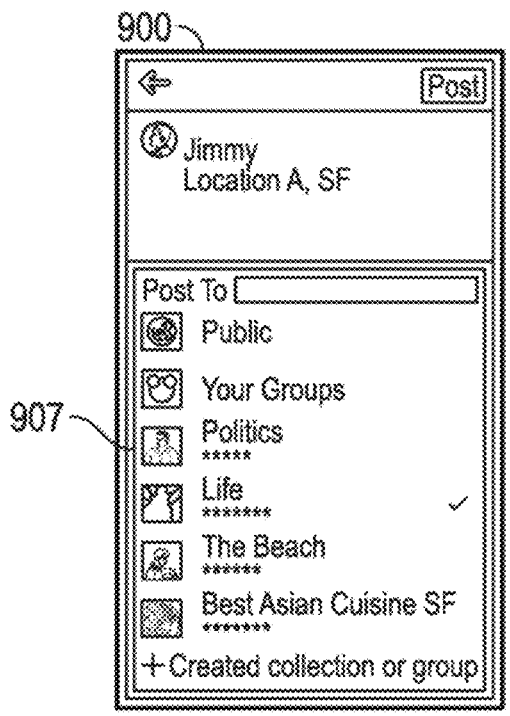
Figure 9F:
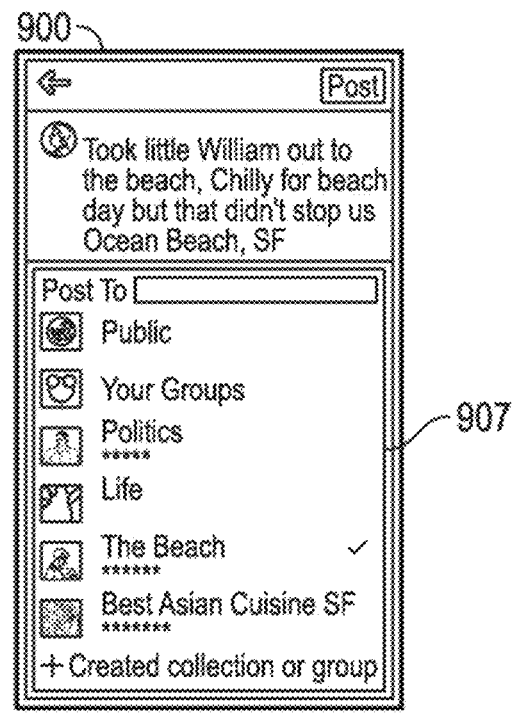
Figure 9G:
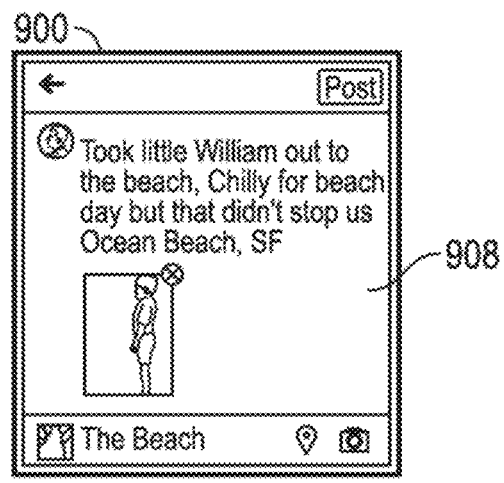

A collection area 906 is further provided to allow the user to select the collection for adding the content item. In one example, the collection area 906 may be prepopulated with a default entry. The user may select to change the default entry or enter a collection into the collection area 906. In response to the selection, a menu 907 displaying all user collections may be provided to the user as shown in FIG. 9E. The user may select a collection from the menu or create a new collection. The user selection is shown in FIG. 9F. Once the user selection of a collection is finalized, an entry 908 is posted to the user collection including the content item along with message as shown in FIG. 9G.

Figure 10A:
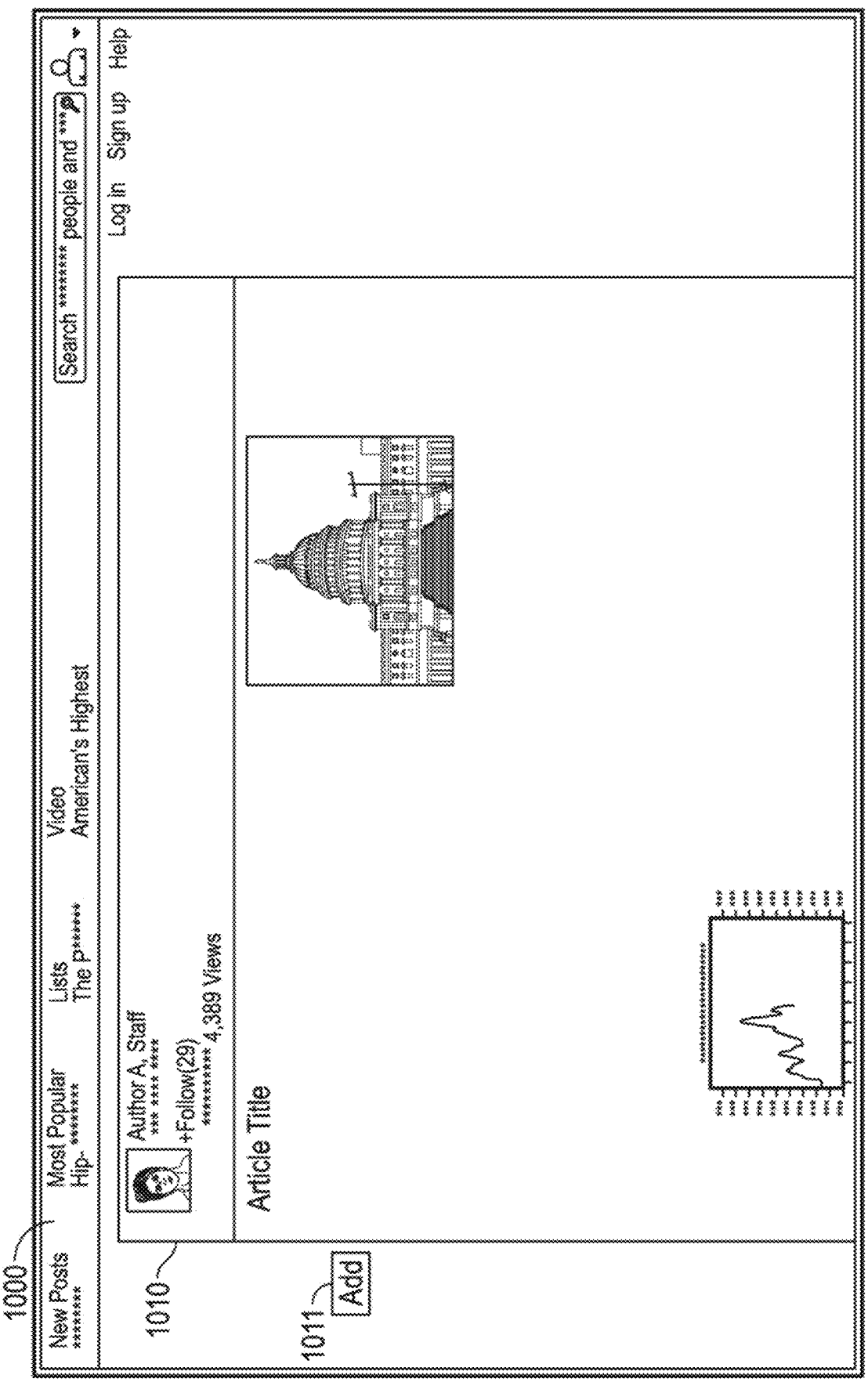
FIGS. 10A-10D illustrate an example process for adding content items to a collection from a third party site.
Figure 10B:
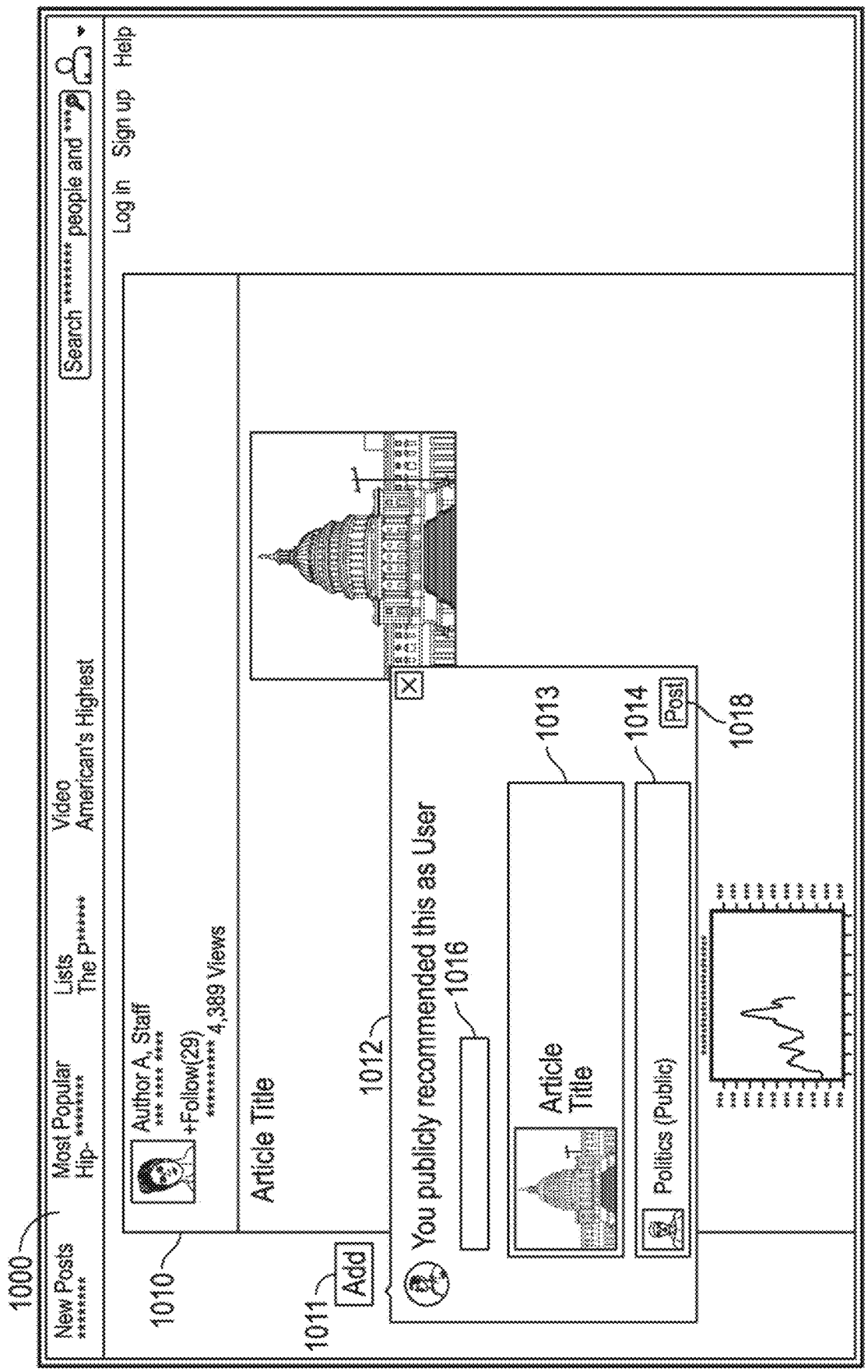
Figure 10C:
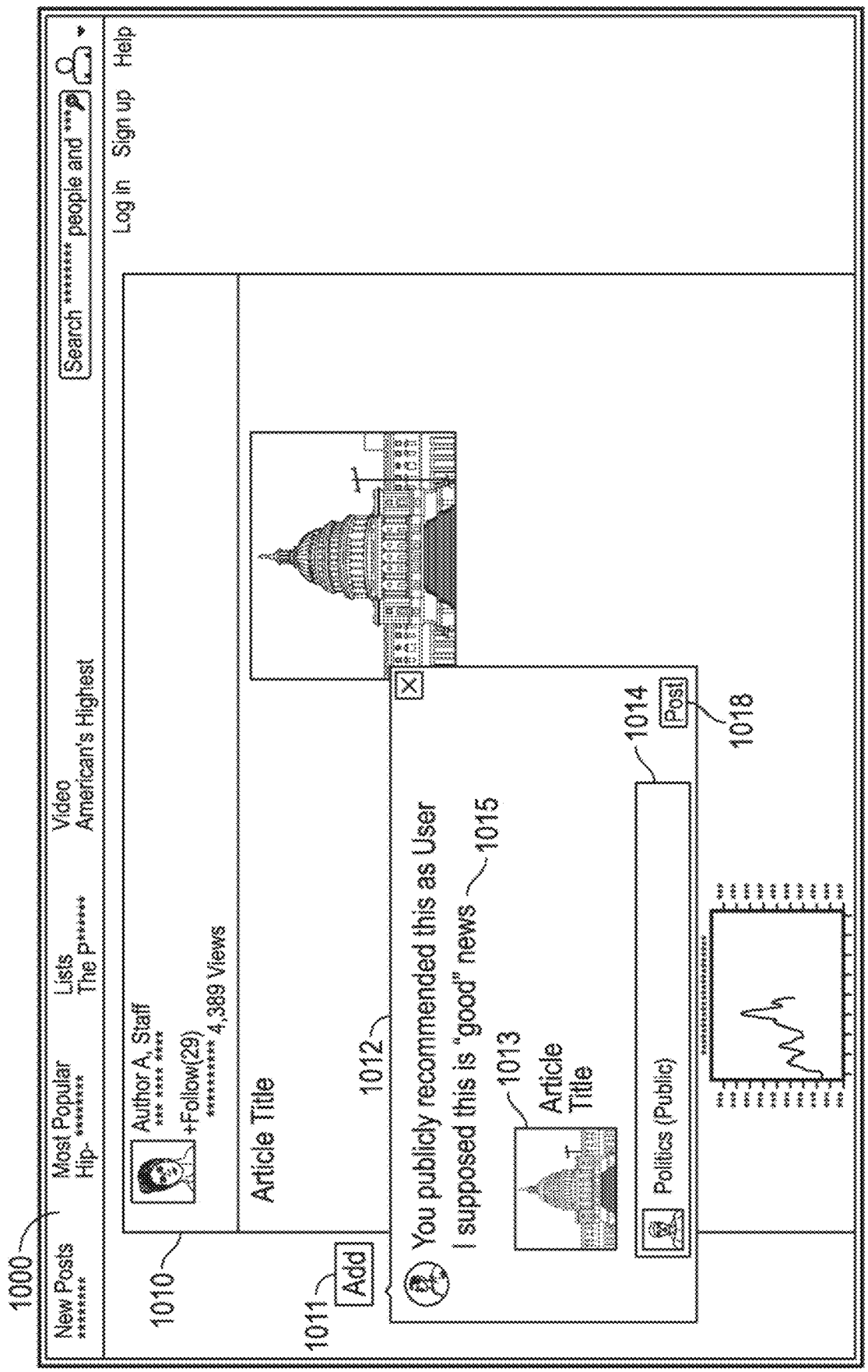
Figure 10D:
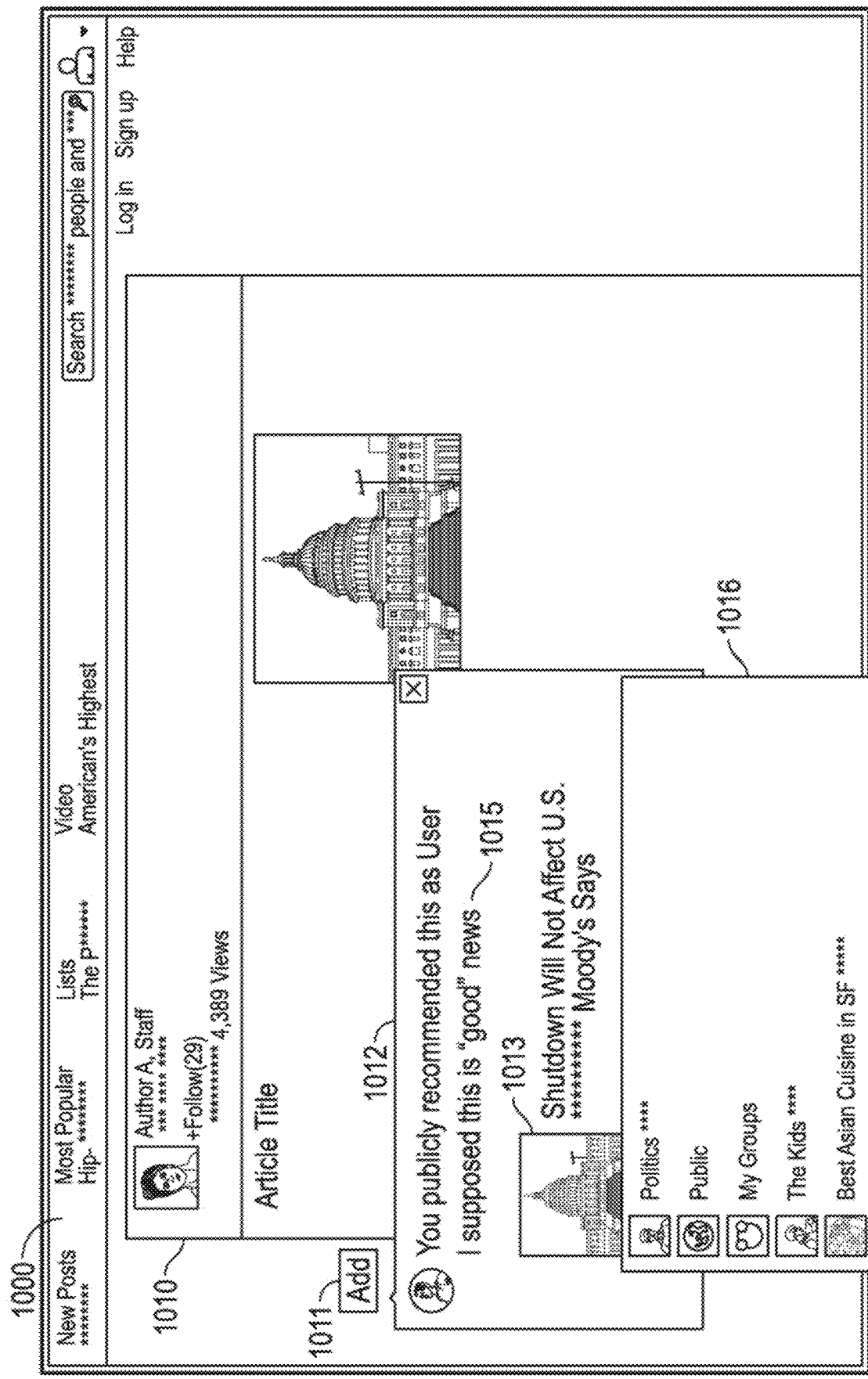

FIGS. 10A-10D illustrate an example process for adding content items to a collection from a third party site. FIG. 10A illustrates an article 1010 being viewed by the user (e.g., at a third party site, locally at the client device or using a browser, or at the social networking service) within a graphical user interface 1000. A mechanism, such as "Add" button 1011, may be provided to the user to allow the user to add the article 1010 to a user collection. Upon selecting the Add button 1011, a window 1012 may be provided for display to the user, as shown in FIG. 10B. The window 1012 may display a snippet 1013 of the article, a collection area 1014, a "Post" button 1015 and a text box 1016 (e.g., as shown in FIG. 10C). The user may enter text into the text box 1016 regarding the article. Collection area 1014 allows the user to select the collection for adding the article 1010. In one example, the collection area 1014 may be prepopulated with a default entry. The user may select to change the default entry or enter a collection into the collection area 1014. In response to the selection, a menu 1016 displaying all user collections may be provided to the user as shown in FIG. 10D. The user may select a collection from the menu or create a new collection. Once the user selection of a collection is finalized, the article is added to the user's selected collection.

Figure 11A:
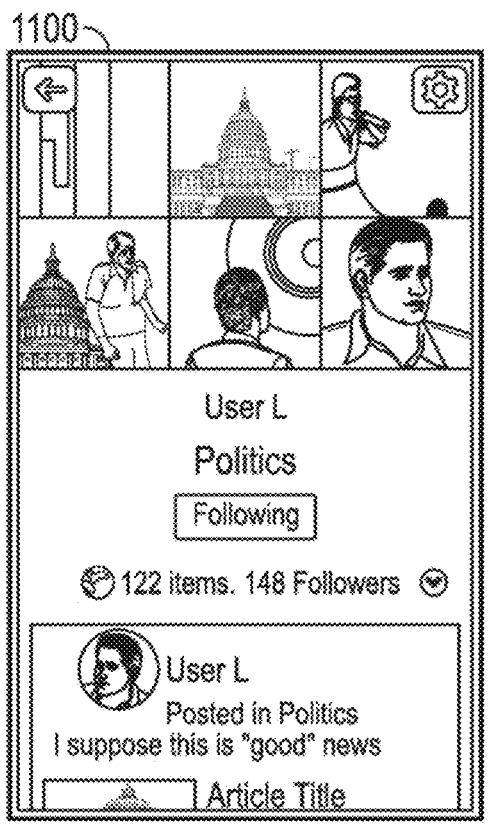
FIGS. 11A-11F illustrate an example process for adding content items to a collection from another user's collection.
Figure 11B:
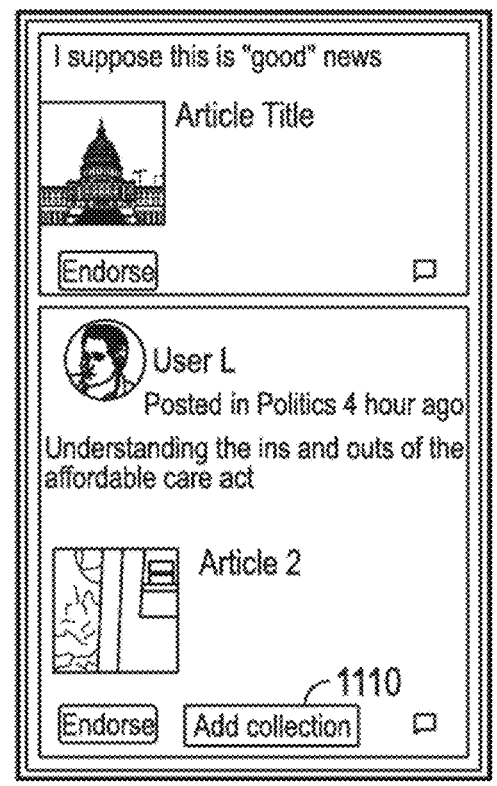
Figure 11C:
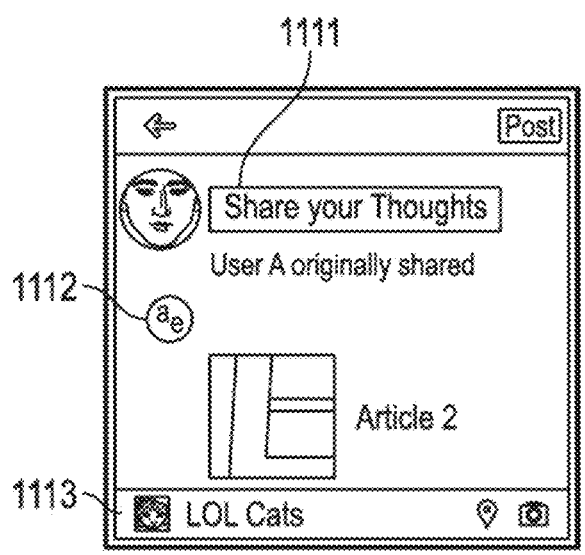
Figure 11D:
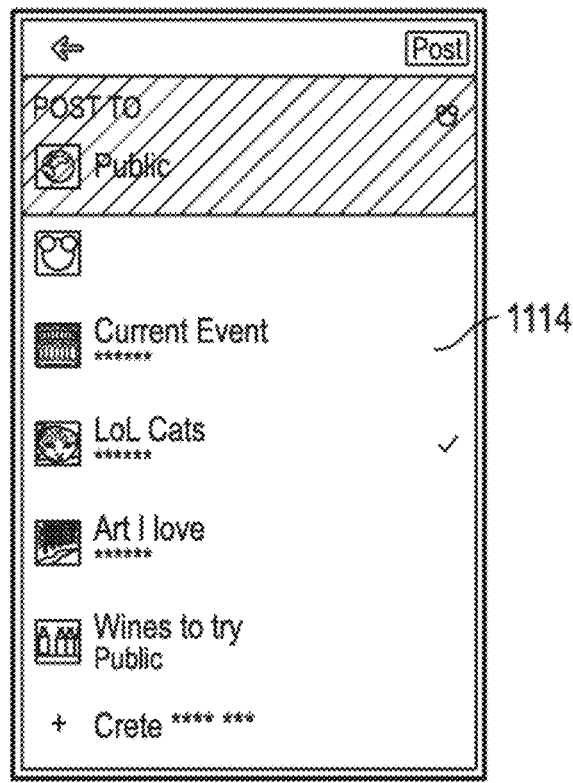
Figures 11E, 11F:
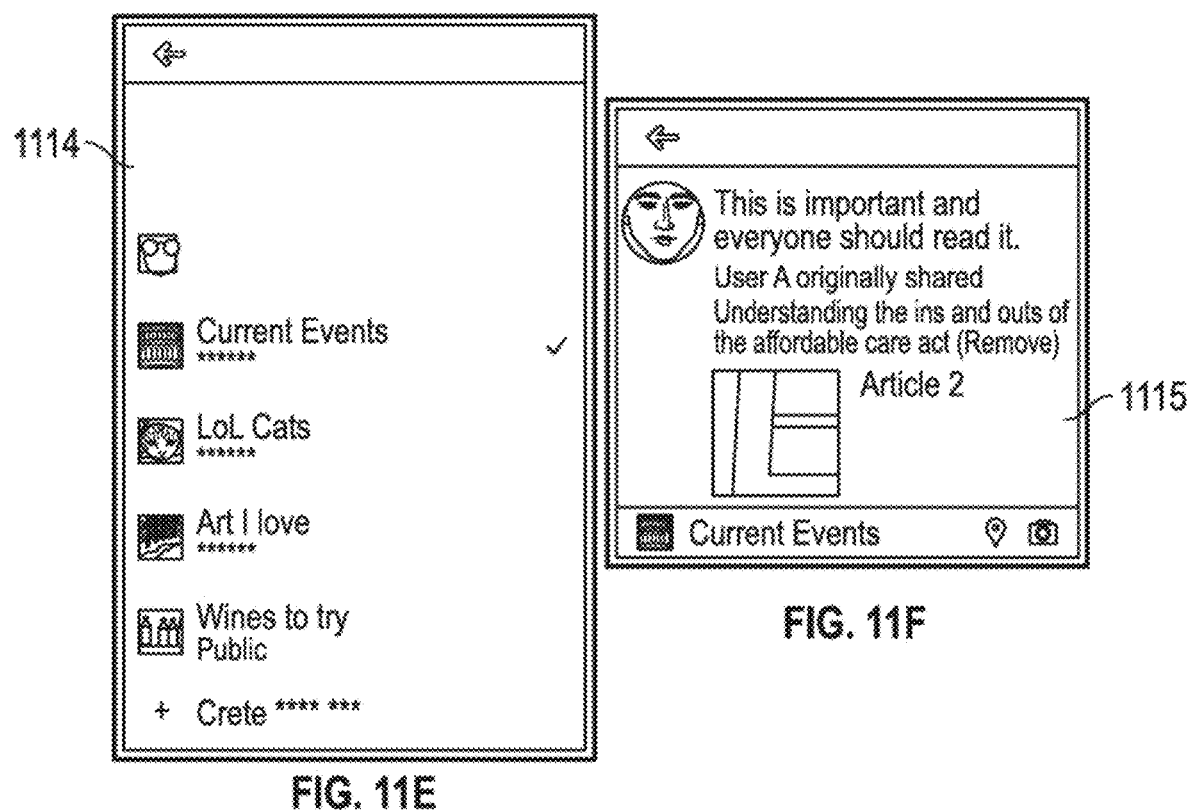

FIGS. 11A-11F illustrate an example process for adding content items to a collection from another user's collection. FIG. 11A illustrates a graphical user interface 1100 displaying a collection belonging to user L, including one or more content items. A user viewing collection of User L, may choose to add a first content item within the collection using an "Add collection" button 1110 as shown in FIG. 11B. Upon selecting to add the item, as shown in FIG. 11C, the content item is displayed to the user, along with a text box 1111, a snippet of the item 1112 and a collection area 1113. Collection area 1113 allows the user to select the collection for adding the content item. In one example, the collection area 1113 may be prepopulated with a default entry. The user may select to change the default entry or enter a collection into the collection area 113. In response to the selection, a menu 1114 displaying all user collections may be provided to the user as shown in FIG. 11D. The user may select a collection from the menu or create a new collection as shown in FIG. 11E. Once the user selection of a collection is finalized, an entry 1115 is posted to the user collection including the content item along with a message as shown in FIG. 11F.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 12:
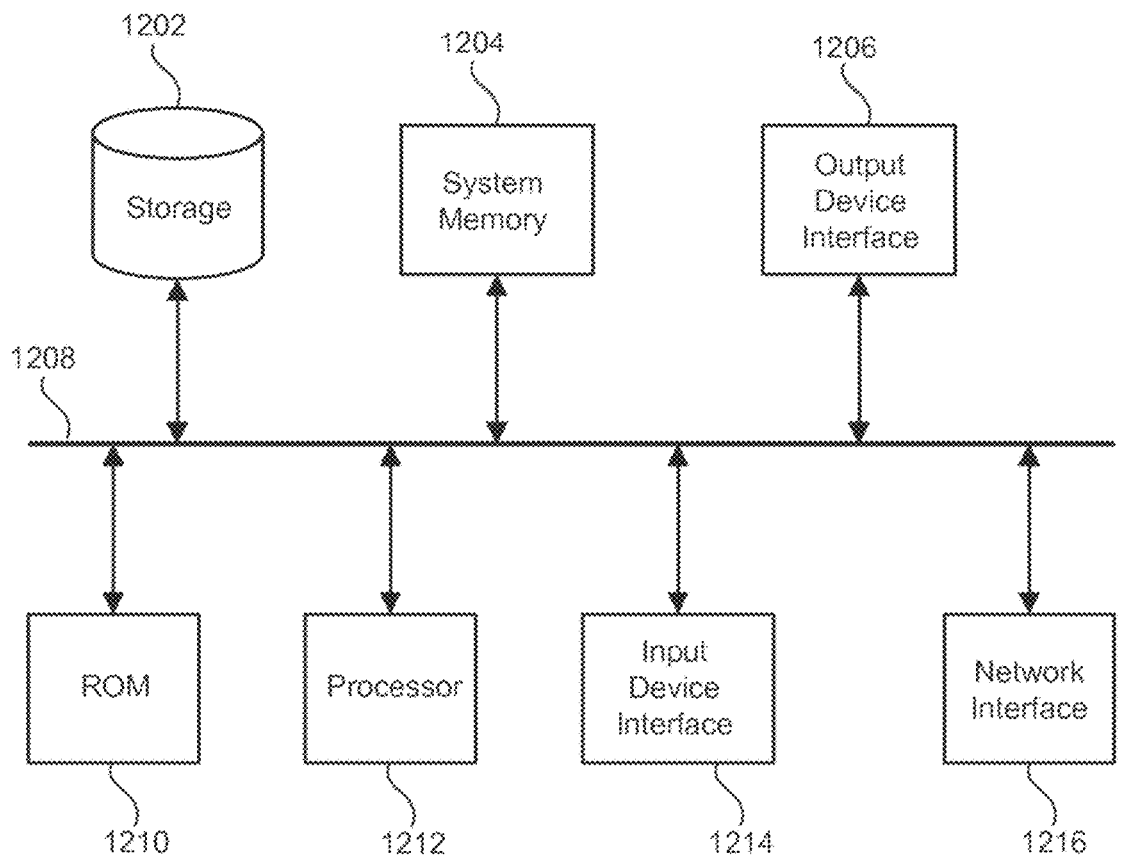
FIG. 12 conceptually illustrates an electronic system with which some implementations of the subject technology are implemented.

FIG. 12 conceptually illustrates an electronic system with which some implementations of the subject technology are implemented. Electronic system 1200 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 1200 includes a bus 1208, processing unit(s) 1212, a system memory 1204, a read-only memory (ROM) 1210, a permanent storage device 1202, an input device interface 1214, an output device interface 1206, and a network interface 1216.

Bus 1208 collectively represents all system, peripheral, and chipset buses that communicatively connect the numerous internal devices of electronic system 1200. For instance, bus 1208 communicatively connects processing unit(s) 1212 with ROM 1210, system memory 1204, and permanent storage device 1202.

From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of the electronic system. Permanent storage device 1202, on the other hand, is a read-and-write memory device. This device is a non-volatile memory unit that stores instructions and data even when electronic system 1200 is off. Some implementations of the subject disclosure use a mass-storage device (such as a magnetic or optical disk and its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such a random access memory. System memory 1204 stores some of the instructions and data that the processor needs at runtime. In some implementations, the processes of the subject disclosure are stored in system memory 1204, permanent storage device 1202, and/or ROM 1210. For example, the various memory units include instructions for facilitating rule-based collections according to various implementations. From these various memory units, processing unit(s) 1212 retrieves instructions to execute and data to process in order to execute the processes of some implementations.

Bus 1208 also connects to input and output device interfaces 1214 and 1206. Input device interface 1214 enables the user to communicate information and select commands to the electronic system. Input devices used with input device interface 1214 include, for example, alphanumeric keyboards and pointing devices (also called "cursor control devices"). Output device interfaces 1206 enables, for example, the display of images generated by the electronic system 1200. Output devices used with output device interface 1206 include, for example, printers and display devices, such as cathode ray tubes (CRT) or liquid crystal displays (LCD). Some implementations include devices such as a touchscreen that functions as both input and output devices.

Finally, as shown in FIG. 12, bus 1208 also couples electronic system 1200 to a network (not shown) through a network interface 1216. In this manner, the computer can be a part of a network of computers (such as a local area network ("LAN"), a wide area network ("WAN"), or an Intranet, or a network of networks, such as the Internet. Any or all components of electronic system 1200 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method comprising:
presenting a user interface to allow a user of a social networking service to create a new collection for collecting a set of content items for the user;
upon a user request to create the new collection, adding the new collection to one or more lists of collections associated with a user profile of the user, and presenting, in the user interface, the new collection as part of the one or more lists of collections associated with the user profile at the social networking service, wherein the one or more lists of collections comprise one or more first collections having the user as an author and one or more second collections having one or more other users of the social network service as one or more authors, wherein the user interface presents (i) each collection of the one or more first collections with an identifier of the user as the author, and (ii) each collection of the one or more second collections with respective one or more identifiers of one or more other users of the social network service as respective one or more authors;

in response to receiving, via the user interface, a user selection of an edit collection button with respect to the new collection, allowing the user to add an additional content item to the new collection from the list of collections associated with the user profile; and in response to receiving, via the user interface, a user selection of a share collection button with respect to the new collection, allowing the user to share the new collection with one or more other users of the social networking service, wherein sharing the new collection with the one or more other users causes a notification to be provided to the one or more other users according to one or more rules.

2. The method of claim 1 wherein the one or more rules are configured by the user from a time collections in the list to be generated any time during a life span of the collections in the list.

3. The method of claim 1 wherein the one or more rules comprise at least one of a rule to notify the one or more other users when content is added to the new collection or a rule to notify the one or more other users when content items in the new collection are ranked according to a setting.

4. The method of claim 1 wherein the user interface (UI) provides a first selectable UI element to view the collections of the user, a second selectable UI element to view collections followed by the user, and a third selectable UI element to view collections suggested for the user.

5. The method of claim 4 wherein the collections of the user are presented with one or more of a name of each of the collections, one or more authors of each of the collections, a number of followers of each collection, a photo representing one or more items in a respective collection, or the edit collection button to update the respective collection.

6. The method of claim 4 wherein the UI allows a viewer to select one of the collections of the user, and view content items of the selected collection, wherein each of the content items is presented with one or more social activity UI elements.

7. The method of claim 5 wherein upon a user selection of the edit collection button to update the respective collection, a plurality of available content items are presented to the user for selection, wherein the plurality of available content items are hosted by one or more of a user device of the user, a social networking service or a third party service.

8. The method of claim 1 wherein the additional content item is selected from a collection of another user.

9. A system comprising:
a memory storing instructions; and
a processor, coupled to the memory, to execute instructions comprising:
presenting a user interface to allow a user of a social networking service to create a new collection for collecting a set of content items for the user;
upon a user request to create the new collection, adding the new collection to one or more lists of collections associated with a user profile of the user, and presenting, in the user interface, the new collection as part of the one or more lists of collections associated with the user profile at the social networking service, wherein the one or more lists of collections comprise one or more first collections having the user as an author and one or more second collections having one or more other users of the social network service as one or more authors, wherein the user interface presents (i) each collection of the one or more first collections with an identifier of the user as the author, and (ii) each collection of the one or more second collections with respective one or more identifiers of one or more other users of the social network service as respective one or more authors;

in response to receiving, via the user interface, a user selection of an edit collection button with respect to the new collection, allowing the user to add an additional content item to the new collection from the list of collections associated with the user profile; and in response to receiving, via the user interface, a user selection of a share collection button with respect to the new collection, allowing the user to share the new collection with one or more other users of the social networking service, wherein sharing the new collection with the one or more other users causes a notification to be provided to the one or more other users according to one or more rules.

10. The system of claim 9 wherein the one or more rules are configured by the user from a time collections in the list to be generated any time during a life span of the collections in the list.

11. The system of claim 9 wherein the one or more rules comprise at least one of a rule to notify the one or more other users when content is added to the new collection or a rule to notify the one or more other users when content items in the new collection are ranked according to a setting.

12. The system of claim 9 wherein the user interface (UI) provides a first selectable UI element to view the collections of the user, a second selectable UI element to view collections followed by the user, and a third selectable UI element to view collections suggested for the user.

13. The system of claim 12 wherein the collections of the user are presented with one or more of a name of each of the collections, one or more authors of each of the collections, a number of followers of each collection, a photo representing one or more items in a respective collection, or the edit collection button to update the respective collection.

14. The system of claim 9 wherein the UI allows a viewer to select one of the collections of the user, and view content items of the selected collection, wherein each of the content items is presented with one or more social activity UI elements.

15. The system of claim 13 wherein upon a user selection of the edit collection button to update the respective collection, a plurality of available content items are presented to the user for selection, wherein the plurality of available content items are hosted by one or more of a user device of the user, a social networking service or a third party service.

16. The system of claim 9 wherein the additional content item is selected from a collection of another user.

17. A non-transitory machine-readable medium comprising instructions stored therein, which when executed by a machine, cause the machine to perform operations comprising:
presenting a user interface to allow a user of a social networking service to create a new collection for collecting a set of content items for the user;
upon a user request to create the new collection, adding the new collection to one or more lists of collections associated with a user profile of the user, and presenting, in the user interface, the new collection as part of the one or more lists of collections associated with the user profile at the social networking service, wherein the one or more lists of collections comprise one or more first collections having the user as an author and one or more second collections having one or more other users of the social network service as one or more authors, wherein the user interface presents (i) each collection of the one or more first collections with an identifier of the user as the author, and (ii) each collection of the one or more second collections with respective one or more identifiers of one or more other users of the social network service as respective one or more authors;

in response to receiving, via the user interface, a user selection of an edit collection button with respect to the new collection, allowing the user to add an additional content item to the new collection from the list of collections associated with the user profile; and in response to receiving, via the user interface, a user selection of a share collection button with respect to the new collection, allowing the user to share the new collection with one or more other users of the social networking service, wherein sharing the new collection with the one or more other users causes a notification to be provided to the one or more other users according to one or more rules.

18. The non-transitory machine-readable medium of claim 17 wherein the one or more rules are configured by the user from a time collections in the list to be generated any time during a life span of the collections in the list.

19. The non-transitory machine-readable medium of claim 17 wherein the one or more rules comprise at least one of a rule to notify the one or more other users when content is added to the new collection or a rule to notify the one or more other users when content items in the new collection are ranked according to a setting.

20. The non-transitory machine-readable medium of claim 17 wherein the user interface (UI) provides a first selectable UI element to view the collections of the user, a second selectable UI element to view collections followed by the user, and a third selectable UI element to view collections suggested for the user.

* * * * *